United States Patent Office 3,351,566
Patented Nov. 7, 1967

3,351,566
STABILIZED HIGH-ACTIVITY CATALYST
William F. Taylor, Scotch Plains, John H. Sinfelt, Berkeley Heights, and David J. C. Yates, Westfield, N.J., assignors to Esso Research and Engineering Company, a corporation of Delaware
No Drawing. Filed Oct. 21, 1963, Ser. No. 317,828
3 Claims. (Cl. 252—452)

ABSTRACT OF THE DISCLOSURE

A solid nickel-silica catalyst having a stabilized high nickel surface area of 45 to 60 sq. meters per gram and total surface area of 225 to about 300 sq. meters per gram of the catalyst in activated condition is prepared by precipitating the nickel and silicate ions from solution as nickel hydrosilicate onto porous silica particles in such proportions that the activated catalyst contains 25 to 50 wt. percent nickel and of its total silica content 30 to 90 wt. percent thereof is derived from the precipitated silicate ions, the catalyst being activated by calcining in air the particles of porous silica with its deposit of nickel hydrosilicate at 600° to 900° F. then reducing with hydrogen the resulting calcined solids at 600° to 900° F.

---

This invention relates to nickel-silicate catalysts of stabilized high nickel-surface area and their preparation involving coprecipitation of nickel combined as a cation with a silicate anion on porous solid particles, preferably porous silica particles.

Nickel-silica catalysts, employing kieselguhr, infusorial, diatomaceous, or siliceous earth as a source of porous silica, are known to have been used widely for low temperature hydrogenation reactions at below 400° F. in which the nickel is in a reduced state and is not exposed to oxidizing gases such as steam or oxygen at elevated temperatures.

Exploratory work on the use of nickel-silica or nickel-on kieselguhr catalysts in steam reforming of naphtha hydrocarbons, principally $C_5$ to $C_8$ paraffins, at temperatures of 600° to 925° F. showed that these catalysts prepared by impregnating kieselguhr with a nickel compound or precipitating a basic carbonate of nickel onto kieselguhr even under optimum conditions of treatment and activation had only moderate activity and became deactivated rapidly.

Investigations now have shown that the activity of the catalysts is related to the nickel surface area in that the catalysts become deactivated as the nickel surface area is lowered which results from oxidation or sintering caused by elevated temperatures.

In accordance with the present invention, nickel-silica catalysts having high nickel surface areas, markedly higher than commercially available nickel-on-kieselguhr catalysts, and whose nickel area is resistant to desurfacing, are prepared by having the nickel cation coprecipitated with a silicate anion onto porous solid silica, followed by proper drying and calcining in air within critical temperature limits.

The nickel surface area can be expressed as area per unit weight of nickel or per unit weight of the total catalyst ($m.^2/g.$). Subsequent references to nickel surface area will be expressed on the basis of area per unit weight of total catalyst. The total silica content of the catalysts can be maintained at a certain level to include the silica from both the coprecipitated silicate and from the kieselguhr (or porous solid silica) particles. Improved catalysts of this invention can have nickel surface areas in the range of 45 to 60 sq. meters per gram of catalyst with a total surface area of 225 to about 300 sq. meters per gram of catalyst.

The method of preparing the stabilized high-activity catalysts of high surface areas in accordance with the present invention comprises the addition of a silicate anion from a source such as alkali silicates, silicic acid or hydrolyzed silicon hydride to an acidic solution of catalytic metal cations and precipitating said cations with silicate anions onto slurried siliceous particles which form a suitable support. The slurried particles are preferably porous silica particles but they may be other substances such as alumina, silica-alumina, and zeolites. Unlike other varieties of catalyst formation, the present method permits reaction of the nickel cation with the silicate anion to form nickel hydrosilicate which is precipitated.

Preferably the coprecipitation of nickel and silicate ions in aqueous solution containing the solid carrier particles is effected by addition of a water-soluble alkaline precipitating compound such as ammonium bicarbonate to the heated solution. Hydroxides, carbonates and bicarbonates of sodium, potassium or ammonium may be used as precipitants. The alkaline ammonium precipitants are most suitable for minimizing the amount of alkali metal residue which has to be removed by washing to avoid poisoning action on the finished catalyst. In some instances the potassium precipitants may be used where the potassium acts as a promoter rather than as a poison.

The salts of the catalytic metal are preferably the water-soluble compounds which can be decomposed by heat, e.g. nitrates, formates or oxalates. The preferred catalytic metal of interest is nickel but other catalytic metals having high hydrogenating activity of Group VIII in the Periodic Table may be used such as cobalt, palladium, platinum and iridium.

In the preferred procedure of preparing the catalyst, sodium metasilicate is added to the aqueous solution of the soluble catalytic metal salt with the porous solid particles slurried in the solution and the resulting mixture is heated. To the heated mixture, the alkaline precipitant, e.g. ammonium bicarbonate, is added to precipitate compounds of nickel and silicon and deposit the precipitant onto the slurried solid particles.

In the preparation of the high activity nickel-silicate-$SiO_2$ catalyst, nickel hydrosilicate is formed and precipitated with heating to temperatures up to about 212° F. or boiling of the solution mixture, the drying of the resulting solid obtained is carried out at 200° to 400° F., and the calcining of the dried solid is carried out with oxygen-containing gas or air at a temperature in the range of 600 to 900° F. Reduction of the metal in the solid is carried out by treatment with hydrogen at a temperature in the range of 600° to 900° F. The reduction activates the catalyst and is preferably carried out when the catalyst has been loaded into the reactor, because after the reduction the catalyst is sensitive to deactivation when stored in the presence of oxygen at ordinary temperatures.

The process conditions including those of heating the solution containing the nickel ions and the silicate ions prior to precipitation and during the precipitation are considered favorable to nickel hydrosilicate formation. The calcining conditions are evidently such as to permit the nickel upon reduction to give a high surface area, even higher than when a support is impregnated with nickel compounds in the form of hydroxides and/or carbonates or when nickel oxides and/or carbonates are coprecipitated with a support material such as aluminum compounds. This fact indicates that the calcined nickel hydrosilicate deposit is highly susceptible to reduction to give the catalyst a high nickel reduced surface area.

The high activity catalyst formed by depositing the nickel hydrosilicate or porous silica and treating it to give it a high nickel surface area is useful in producing high B.t.u. gas rich in methane from higher hydrocarbons, e.g. ethane, propane or butane, and from normally liquid naphtha hydrocarbons containing $C_5$ to $C_8$ paraffins in a low temperature reaction with steam at a temperature of 600° to 925° F. and under a pressure of 1 to 70 atmospheres using 1.5 to 2.5 lbs. of steam per lb. of hydrocarbon.

In the presence of this high activity catalyst, hydrocarbons are easily cracked and hydrogenated.

In a demonstration of the invention, a stabilized nickel-silicate-kieselguhr catalyst was prepared as described in the following example.

*Example 1*

A nickel, combined silicate and kieselguhr catalyst was prepared as follows: 50 g. of acid washed kieselguhr was added to 3.5 liters of deionized water. To the slurry was added 750 g. of $Ni(NO_3)_2 \cdot 6H_2O$ and 320 g. of $$Na_2SiO_3 \cdot 9H_2O$$

and heated to boiling while stirring. The Ni and silicate ions were coprecipitated by adding 800 g. of $NH_4HCO_3$ to the heated slurry. After the precipitation was completed, the slurry was boiled and stirred for an additional 3 hours. The resulting slurried solid was then separated by filtration and washed repeatedly. The washed solids were dried overnight at 230° F. and then calcined for 4 hours in air in an oven at 750° F. The calcined solid material analyzed 43.7 wt. percent nickel and had a total surface area of 304 m.$^2$/g. of catalyst as measured by $N_2$ B.E.T. after calcination and a nickel area of 47 m.$^2$/g. of catalyst as measured by the $H_2$ chemisorption technique after reduction with $H_2$ at 700° F. for 15 hours.

In the following examples illustrating effectiveness of the catalyst, the space velocity is given in terms of weight of hydrocarbon per hour per weight of catalyst (w./hr./w.) and HC represents the hydrocarbon feed.

*Example 2*

The catalyst prepared in Example 1 was tested for the production of methane rich fuel gas as follows: The catalyst was first pre-reduced with $H_2$ at 700° F. for 10 hours. Then 5.6 w./hr./w. of 95% n-hexane was passed over the catalyst at 700° F. (temperature of the lead bath into which the reactor was immersed) and 500 p.s.i.g. along with 2 lbs. of steam per lb. of hydrocarbon. During hours 24 to 34 the catalyst converted 51.1% of the feed producing a gas of the following composition:

| | Mole percent gas (dry, no $C_2+$ basis) |
|---|---|
| $CH_4$ | 57.87 |
| $H_2$ | 19.85 |
| CO | .03 |
| $CO_2$ | 22.25 |

This gas has a heating value (on a dry, no $C_2+$ material basis with all but 2% of the $CO_2$ removed) of 818 B.t.u./s.c.f.

*Example 3*

The catalyst was prepared in accordance with Example 1 and was tested for hydrogenation reactions as follows: The catalyst was pre-reduced with $H_2$ at 670° F. overnight. Ethylene was then passed over the catalyst at 40.3 w./hr./w. at atmospheric pressure along with $H_2$ using a $H_2$/HC mole ratio of 6.7. At 140° F. the catalyst hydrogenated 100% of the feed ethylene. Even when the temperature was lowered to 95° F. the catalyst still hydrogenated 100% of the ethylene.

*Example 4*

The catalyst prepared in accordance with Example 1 was tested for hydrocracking or hydrogenolysis as follows: The catalyst was pre-reduced with $H_2$ at 700° F. overnight. Then 11.2 w./hr./w. of ethane was passed over the catalyst at atmospheric pressure along with $H_2$ at a $H_2$/HC mole ratio of 6.7. At 500° F. the catalyst hydrocracked 92.7% of the ethane in the feed and at 550° F. hydrocracked 98.2% of the ethane in the feed to form methane.

The incorporation of silicate anions in the preparation of the catalyst was found to make a marked improvement in the catalytic nickel metal surface area. The nickel surface area obtained, incorporating silicate with nickel on kieselguhr particles, was found to be as much as about 50% higher (54 m.$^2$/g.) than those of the best available commercial nickel-kieselguhr catalyst, which have a nickel surface area of 35 m.$^2$/g. The nickel surface area of the stabilized catalyst formed from precipitation of the nickel with silicate was found to be 8 times greater than achieved with laboratory preparations in which the catalyst was formed by precipitating nickel on kieselguhr by ammonium bicarbonate but without incorporating silicate as prescribed herein.

The nickel surface area of the calcined and reduced catalyst made by incorporating silicate anions when precipitating the nickel cations was found to go through a sharp maximum as the silicate concentration is increased with respect to the total silica for catalysts containing different amounts of nickel, e.g. 25 to 50 wt. percent. This maximum nickel surface area in the range of 50 to 60 m.$^2$/g. occurs when the silica from the precipitated silicate anion is 30 to 75 wt. percent of the total silica including the silica of the carrier. In addition, the total surface area of the catalyst also reaches a maximum when the silica of the silicate is increased in the range of 40 to 90 wt. percent of the total silica. Outside this range the total surface area sharply declines.

The effect of the precipitated silicate is surprising and difficult to explain, but it may be postulated that the catalytic metal may be bonded to the silicate, which prevents migration of the metal crystallites and thus stabilizes the active metal against sintering. The porous solid particles on which the catalytic metal cation compounds are deposited along with the silicate may serve as nuclei for precipitation of a porous catalyst and it is thus possible that when the precipitated silicate tends to exceed the amount desired for maximum surface area of the catalystic metal and of the catalyst as a whole, a non-porous relatively inactive catalyst results. The technique described of the incorporated silicate in making the catalyst may be used in preparing catalysts of various shapes and sizes. Catalyst particles of a suitable size may be obtained by crushing and screening the calcined catalyst, or the catalyst may be formed into pills or extruded by suitable means.

The deposit of the catalytic metal with silicate may be made on various porous support materials which are well known, such as refractories, oxides, asbestos, carbon, etc., when it is desired to have a highly active Group VIII or transition metal of stabilized high surface area on a support.

The invention described is claimed as follows:

1. A solid nickel-silica catalyst having a stabilized high nickel surface area of 45 to 60 sq. meters per gram and total surface area of 225 to about 300 sq. meters per gram of the catalyst in activated condition is prepared by precipitating the nickel and silicate ions from solution as nickel hydrosilicate onto porous silica particles in such proportions that the activated catalyst contains 25 to 50 wt. percent nickel and of its total silica content 30 to 90 wt. percent thereof is derived from the precipitated silicate ions, the catalyst being activated by calcining in air the particles of porous silica with its deposit of nickel hydrosilicate at 600° to 900° F. then reducing with hydrogen the resulting calcined solids at 600° to 900° F.

2. A catalyst as defined in claim 1 wherein the porous solid silica is kieselguhr and the silica derived from the precipitated silicate ions present in the activated catalyst is in a proportion of 30 to 75 wt. percent of total silica in the catalyst.

3. The method of preparing a solid nickel-silica catalyst having a stabilized high nickel surface area, which comprises forming an aqueous solution of nickel salt and of silicate ions, slurrying in said solution kieselguhr particles, heating said solution containing the slurried particles, adding to the heated solution containing the slurried particles an alkaline precipitant to deposit nickel hydrosilicate on the kieselguhr particles, drying the resulting solid particles having the nickel hydrosilicate deposit thereon, calcining the resulting dried particles in air at 600° to 900° F., the proportion of nickel hydrosilicate deposited on the kieselguhr being such that the catalyst formed by reducing the calcined dried particles with hydrogen at 600° to 900° F. contains 25 to 50 wt. percent nickel with silica, 30 to 90 wt. percent of total silica content therein being from the precipitated silicate ions to give the catalyst when activated a nickel surface area of 45 to 60 sq. meters per gram and a total surface area of 225 to 300 sq. meters per gram.

References Cited

UNITED STATES PATENTS

| 2,449,295 | 9/1948 | Gutzeit | 252—466 |
| 2,658,875 | 11/1953 | Schuit et al. | 252—452 |

FOREIGN PATENTS

| 641,332 | 8/1950 | Great Britain. |

DANIEL E. WYMAN, *Primary Examiner.*

C. F. DEES, *Assistant Examiner.*